March 29, 1960  H. B. MILLER  2,930,912
COMPOSITE ELECTROMECHANICAL TRANSDUCER
Filed May 14, 1956  4 Sheets-Sheet 1

INVENTOR.
HARRY B. MILLER
BY Francis L. Masselle
ATTORNEY

March 29, 1960  H. B. MILLER  2,930,912
COMPOSITE ELECTROMECHANICAL TRANSDUCER
Filed May 14, 1956  4 Sheets-Sheet 2

INVENTOR.
HARRY B. MILLER
BY
ATTORNEY

March 29, 1960 H. B. MILLER 2,930,912
COMPOSITE ELECTROMECHANICAL TRANSDUCER
Filed May 14, 1956 4 Sheets-Sheet 3
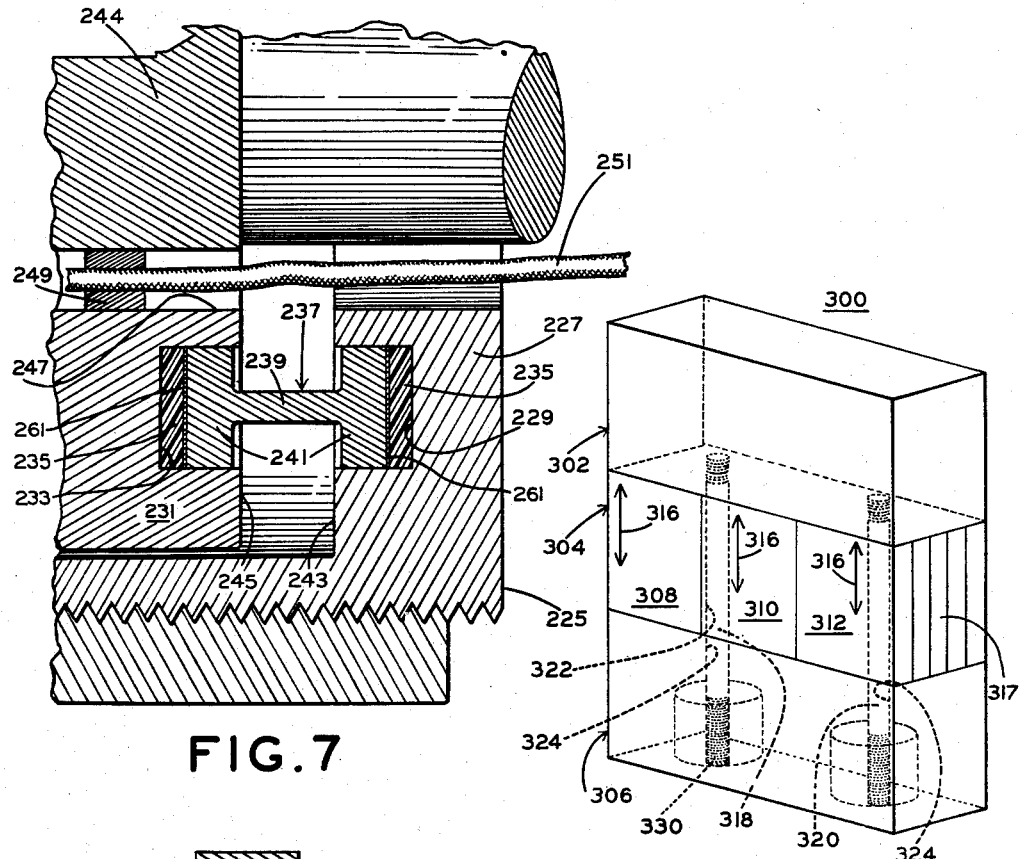
FIG.7
FIG.8
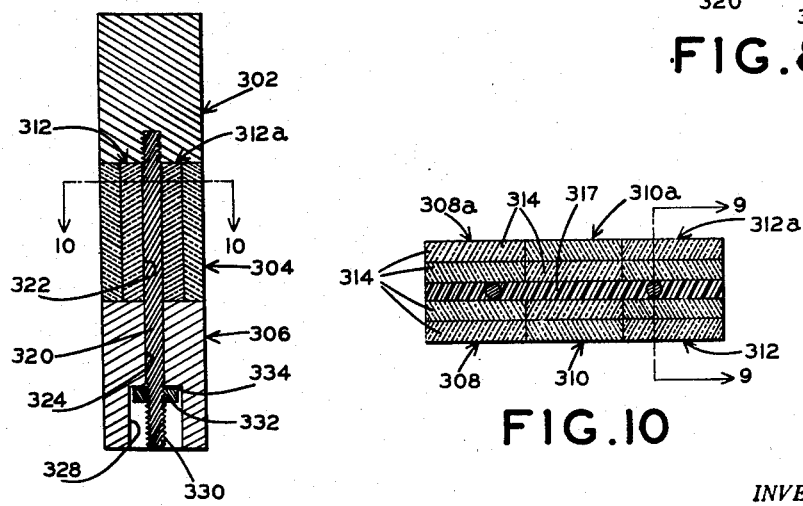
FIG.9
FIG.10
INVENTOR.
HARRY B. MILLER
BY Francis L. Masselle
ATTORNEY March 29, 1960 H. B. MILLER 2,930,912
COMPOSITE ELECTROMECHANICAL TRANSDUCER
Filed May 14, 1956 4 Sheets-Sheet 4

*INVENTOR.*
HARRY B. MILLER
BY
ATTORNEY

2,930,912

COMPOSITE ELECTROMECHANICAL TRANSDUCER

Harry B. Miller, Cleveland Heights, Ohio, assignor to Clevite Corporation, Cleveland, Ohio, a corporation of Ohio Application May 14, 1956, Serial No. 584,647

20 Claims. (Cl. 310—26)

This invention pertains to electromechanical transducers for converting between electrical and mechanical forms of energy, and particularly to transducers for generating longitudinal or acoustic waves in a transmission medium in response to an applied electric signal. Such transducers conventionally and commonly are adapted both to generate and receive acoustic energy and while the invention is applicable to such transducers it will be appreciated, as the description proceeds, that the invention is primarily concerned with the generating of acoustic energy whether by an independent generating unit or a combination generating and receiving unit.

Well known in the art are three basic types of transducers: piezoelectric, magneto-strictive and, more recently, the piezoelectric response of certain polarized ferroelectric polycrystalline ceramics. In the following description all three types will be referred to generically as "electromechanical transducers" or by words of similar import.

Single crystals of quartz, ammonium dihydrogen phosphate ($NH_4H_2PO_4$), Rochelle salt, and many other natural and synthetic materials are piezoelectric in nature, generating an electrical charge in response to distortion and being distorted by the application of an electric field or voltage. Such crystals and sections thereof are, therefore, natural transducers between electrical and mechanical forms of energy. In comparatively recent times, certain polycrystalline ceramics, perhaps the most notable of which is barium titanate ($BaTiO_3$), have been found to exhibit a similar transducing action when pre-polarized by the application of a strong, unidirectional field as fully described and claimed in U.S. Patent No. 2,486,560 to Gray. Another example of such ceramics are lead titanate zirconate solid solutions disclosed and claimed in U.S. Patent No. 2,708,244 to Bernard Jaffe.

Among the important practical applications of piezoelectric materials is their use to generate sound waves in a transmission medium, for example, as is done in depth sounding, submarine detection and the like. With the development of such applications several problems arose, many of which have defied complete and satisfactory solution heretofore. Among these are the provision of transducers capable of high power operation without cavitation (which leads to rapid destruction of the unit) and the achievement of a high over-all electromechanical coupling and good impedance match to the transmission medium. Ancillary problems include proper mounting of the active elements and the attainment of a compact unit.

Considering the problem of cavitation-limited power input, increasing the radiation area of the transducer allows a higher power input but, particularly when utilizing a single crystal transducer element, the maximum size of the element is limited by the size of the crystal. One method resorted to in order to raise the effective radiation area and/or decrease the resonant frequency of the active element or elements of transducers has been to cement them to a metallic member such as a plate or bar. Thus the metallic member is driven or forced to vibrate by the active elements. While this system is satisfactory to a certain extent, it involves certain compromises and creates a new problem, namely, that of providing a satisfactory adhesive or cement for joining the elements to the plate. To date no completely satisfactory cement, i.e., one which forms a bond of the requisite high tensile strength, possesses sufficient plasticity and has a mechanical Q coefficient which is high enough so as not to reduce the overall electromechanical coupling of the transducer, has been found.

With the advent of the piezoelectric ceramics, somewhat greater control of the size and shape of the active elements has become possible than with crystal elements but nevertheless, this control is limited by the problems encountered in the fabrication and polarization of large ceramic ware. As a result, cementing of piezoelectric elements together or to other members is still necessary for the aforementioned as well as various other reasons, e.g., simply for mounting or to vary the mass so as to adjust the resonant frequency. In some cases a mosaic of crystals is cemented between plates to attain a transducer having the desired operating characteristics.

In cementing piezoelectric crystal and ceramic elements, the plane of the joint is usually substantially perpendicular to the axis of electromechanical response. Assuming that a piezoelectric ceramic disc which expands and contracts in a thickness mode has one face cemented to a metal plate, the disc may be considered as tending to expand and contract relative to a central plane midway between its faces. Consequently, on contraction of the disc, the cemented face tends to pull away from the plate. This action ultimately results in failure of the joint and decoupling of the active and inactive members of the transducer unit. The same is true in the case of a plurality of piezoelectric elements stacked and cemented together.

Magnetostrictive transducers comprising several, i.e., two or more, components cemented together are subject generally to the same problems as the piezoelectric crystal and ceramic type.

The present invention contemplates a composite electromechanical transducer unit in which the component parts are joined wholly without cement or by means of a cement selected primarily on the basis of its plasticity and mechanical Q with only secondary regard for its adhesive qualities. A particular feature of the invention is an electromechanical transducer unit comprising a plurality of elements coupled to act like a single, noncomposite unit partially or entirely by means of a resilient, mechanical compressive force or bias applied to the unit as hereinafter described.

It is, therefore, a fundamental general object of the present invention to provide electromechanical transducer units which substantially overcome at least one of the problems outlined above.

Another important object is to provide composite electromechanical transducer units in which the operating power is not limited by the tensile strength of an adhesive bond joining component elements.

Still another object is to provide composite electromechanical transducer units which operate essentially as a non-composite or integral structure.

A further object is to provide composite electromechanical transducer units in which adhesive materials bonding the component parts may be selected primarily for their ability to acoustically rather than mechanically couple such parts.

A still further object is the provision of a method for mechanically coupling a plurality of electromechanically active elements of an electromechanical transducer.

These and further objects and the advantages of the present invention will be apparent to those conversant with the art from the following description and subjoined claims taken in conjunction with the annexed drawings in which, Figure 1 is a graph depicting the theoretical correlation between applied signal and mechanical response in a conventional piezo-electric transducer and one embodying the present invention;

Figure 2 is a longitudinal sectional view, on line 2—2 of Fig. 3, of an electromechanical transducer unit embodying the present invention;

Figure 3 is a right hand end elevation of the unit shown in Figure 2;

Figure 7 is a fragmentary enlargement of a portion of Figure 6;

Figure 8 is a perspective elevational view of still another modification of the invention;

Figure 9 is a vertical sectional view of the structure shown in Figure 8, the plane of the section being indicated by line 9—9 in Figure 10;

Figure 10 is a sectional view on line 10—10 in Figure 9;

Figure 4:
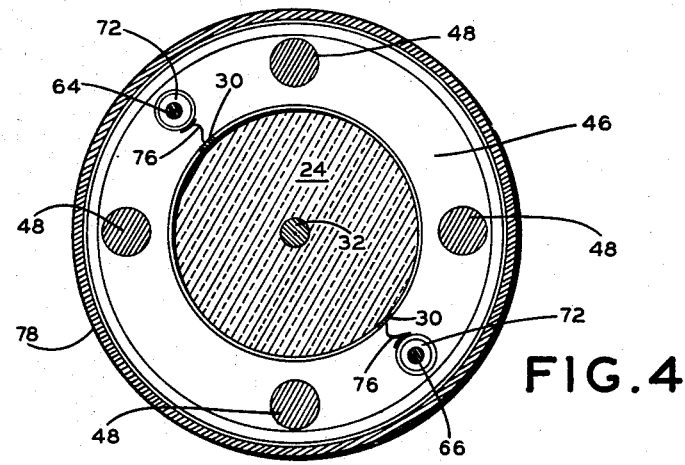
Figure 4 is a cross-section taken on line 4—4 of Figure 2 looking in the direction of the arrows.

Before describing specific exemplary embodiments thereof, the general underlying theory of the subject invention will be explained.

As mentioned briefly hereinabove, in electromechanical transducers it is frequently necessary for the various reasons stated to cement an active element such as a piezoelectric crystal or crystal segment or an electromechanically active ceramic or magnetostrictive element to an inactive member such as a metal bar or plate. As will be explained presently, a plurality of active members may also be cemented or joined together to act as a single unit.

For purposes of explanation, a case will be assumed where a stack of ceramic discs are to be used as the active or driving unit in a transducer, the discs being polarized in the thickness direction and having electrodes on their opposite major planar surfaces. Such discs are known in the art as "expanders" since, if a D.-C. electric voltage of the correct polarity is applied to the electrodes of such a disc, it will expand in thickness as compared to its mean, normal, or unenergized condition. When the applied voltage is removed, the disc returns (contracts) to its normal thickness whereas if the polarity of the applied voltage is reversed, the disc contracts beyond its mean or normal position to a state in which its thickness is less than in the original or unenergized state. The amount of expansion and contraction is directly proportional to the amplitude of the voltage. Thus the action of an expander disc with an A.-C. signal voltage applied may be visualized as a sinusoidal oscillation. In a stack of such discs cemented together face-to-face, the expansion of the individual discs is cumulative, i.e., the discs expand individually and progressively displace each other so that, assuming both ends of the stack to be unrestrained, the greatest displacement occurs at the ends of the stack while in the region of the midpoint there exists a theoretically static condition or node.

It will be appreciated that during the expansion half-cycle the individual discs, in their outward displacement, acquire a momentum directly proportional to the velocity, which momentum tends to pull the stack apart. When the stack is operating at its resonant frequency this momentum is sufficient to put a severe tensile stress on the cement bond between the discs. Since the momentum is a function of mass as well as velocity, this stress is a maximum at two points in the case of a stack unrestrained or "free" at both ends. Each of these points is intermediate the static center or node of the stack and a respective end. Thus, the tensile strength of the cement bond at or nearest these points of maximum stress, if sufficient, preserves the integrity of the stack and, consequently, this strength imposes the limit on the mechanical power output of the unit.

Furthermore when, during the contraction half-cycle, the voltage across each disc falls to zero and then reverses its polarity, the discs contract individually each toward its own respective midpoint or node point with the result that the various cemented faces tend to pull away from each other. This occurs even at non-resonant frequencies and imposes an additional stress on the cemented joints. At this stage also, it is only the tensile strength of the cement bond which, if sufficient, preserves the integrity of the stack and allows it to contract as a unit.

For purposes of clarity, the stress occurring during the expansion cycle will be referred to as the "expansion stress" while that encountered during contraction may be termed the "contraction stress." In either case, the maximum value of A.-C. signal voltage which may be applied to energize or "drive" the stack is limited by the tensile strength of the cement bond. If this value is exceeded, the stack literally and figuratively tends to fly apart.

While the foregoing explanation is stated in terms of a plurality of active elements to highlight or emphasize the action, it will be appreciated that the same conditions exist where a single active element is cemented to another active element or to an electromechanically inactive member.

Regarding the cement used in a composite transducer, there are three basic requirements, viz., (1) the tensile strength of the cement bond must be high because this factor limits the maximum signal voltage which may be applied to energize the transducer; (2) the mechanical Q and (3) the plasticity of the cement must also be high so as to minimize mechanical losses in the vibrating stack. Unfortunately, no cement known has all the requisite properties in the optimum degree and, consequently, all transducers heretofore produced requiring a cemented composite structure have entailed detrimental compromises.

According to the present invention, broadly stated, the adhesive action of the cement can be partly or entirely replaced by a D.-C. mechanical bias means of low A.-C. stiffness (as hereinafter explained) arranged to compress the piezoelectric elements a predetermined quantity from the neutral or mean condition assumed thereby when unenergized. This basic concept will now be explained and amplified with continued reference to Figure 1 of the drawings which includes a graph of a pair of one-cycle sine wave curves A (dotted line) and B (dotted line), in phase, plotted against dual ordinates. The dotted line sine wave curve A referred to the right hand ordinate is an idealized representation of the wave form of an A.-C. voltage. Since, as previously mentioned, the mechanical displacement of each piezoelectric element is directly proportional in sign and magnitude to the polarity and amplitude, respectively, of the applied A.-C. signal voltage, curve B, referred to the left hand ordinate, represents the corresponding expansion and contraction of each element in a thickness mode in response to the signal voltage. It will be assumed that the positive half-cycles of A.-C. signal voltage cause expansion (thickening) of the elements and the negative half-cycles cause contraction. Horizontal base line C, for the first complete cycle, represents the mean value of both signal and displacement.

At the initial point (left hand end) of curves A and B the effective signal voltage is zero and the piezoelectric elements are in a neutral condition (displacement=0). As the signal voltage reaches a positive maximum at 90° phase angle, the elements correspondingly expand to a maximum thickness and thereafter begin contracting, reaching neutral condition (normal or unenergized thickness) as the negative-going voltage reaches zero at 180°. Thereafter, the voltage enters the negative half-cycle and the piezoelectric element responds by contracting until it reaches its maximum contraction (minimum thickness) simultaneously as the voltage reaches its maximum negative value at 270°. As the positive-going voltage returns to zero in the completion of the negative half-cycle, the piezoelectric elements once again assume neutral condition at 360°, whereupon the cycle is repeated. The difficulties encountered with cemented elements due to expansion stress and contraction stress already have been described and these may be eliminated in accordance with one feature of the present invention by applying a mechanical biasing force to pre-compress the element or elements to the position of maximum contraction reached in operation without such bias. This position is determined by the maximum voltage that will be applied in service. Thus in Figure 1, the pre-compression or D.-C. mechanical bias applied is represented by a dotted line arrow D. This mechanical bias pre-compresses the elements so that, with zero signal voltage, they are in the same contracted condition as when the A.-C. signal reaches its negative maximum at the ¾ point of the first cycle. This is represented graphically by establishing a new mean line E. From the point where the mechanical bias D is applied, the signal voltage and mechanical action are represented by curves A' and B' which are, respectively, substantially identical in form to curves A and B.

With the mechanical bias applied, when the signal voltage is at zero the element is at its mean point relative to base line E albeit compressed by amount D from its original mean at base line C. As the signal voltage moves from the 1 to 1¼ cycle points, the elements expand (as permitted by the low A.-C. stiffness of the mechanical bias means) to a maximum coinciding approximately with the original base line C.

In the light of what has already been explained, it will be understood that this expansion of each element is in two opposite directions, relative to a central plane perpendicular to the axis of expansion, and is electrically induced. During this portion of the mechanical cycle, represented by the segment of curve B' extending between the 1 and 1¼ cycle points, the momentum of each element is counteracted not only by its elasticity but, externally, by the mechanical biasing means. As the signal voltage passes from the positive maximum, through zero, to the negative maximum, the mechanical action of the elements is defined by the segment of curve B' extending between the 1¼ cycle and 1¾ cycle points. This contraction, however, is not of the same nature as that occurring without mechanical bias. Without the bias, the contraction of the element is produced by the elasticity of the element and also by electromechanical transduction, and occurs in opposite directions toward the central plane of the element. In the case of a plurality of stack of elements, this results in the tendency of the external surfaces of the elements to separate or draw away from contiguous surfaces. With the mechanical bias applied according to the present invention, the contraction of the stack as a whole is aided by the mechanical force of the biasing means, which force causes the stack to contract as an integral unit as the electromechanical expansion force decreases in response to the falling signal voltage.

From the foregoing it will be appreciated that mechanical bias of the nature hereinafter described by means of exemplary physical embodiments compels a composite transducer to operate as if it were a unitary structure.

The explanation given and the curves shown in Figure 1 are idealized and theoretical and it is emphasized that certain conditions relating primarily to the nature of the pre-compression or biasing force must be met in order to approach the theoretical analysis in a practical operating structure. For example, if the biasing force were applied by means of a massive clamping structure, the longitudinal expansion of the stack would be severely impeded; on the other hand a simple coil spring would be ineffective to exert sufficient force.

The present invention contemplates certain practical structures fulfilling the requisites for the compression or bias means which will be set forth as this description proceeds. However, from what has already been disclosed it will be apparent to those skilled in the art that the action of the electromechanically active element or a plurality of such elements with the mechanical bias applied is such as to render cementing of the elements largely or entirely unnecessary.

In applying the inventive concept to a practical structure, it is essential that the pre-compression means (which in practice is, effectively, a "soft" spring as hereinafter described) shall be capable of delivering high force (depending on the amplitude of the signal voltage) in conjunction with relatively low stiffness so as not to unduly impede the expansion of the piezoelectric element. In other words, the pre-compression means must not appreciably increase the over-all stiffness of the stack because this would decrease the over-all coupling factor and hence the over-all bandwith of frequency response.

A "soft" spring, as referred to herein may best be described by use of the basic spring equation:

$$F_0 = kX_0 \qquad (1)$$

wherein $F_0$ is the restoring force exerted by a spring having a stiffness $k$ when displaced (compressed or stretched) by the amount $X_0$. For a linear (theoretically perfect) spring $k$ is a constant and, in practice, $k$ is nearly constant for small displacements. Therefore if the spring is compressed from its initial state $X_0$ to $X_1$; the restoring force becomes $F_1$, thus, $$F_1 = kX_1 \qquad (2)$$

To produce a small additional displacement $\Delta X$, an additional force $\Delta F$ is required, expressed mathematically as $$F_1 + \Delta F = k(X_1 + \Delta X) \qquad (3)$$

subtracting (2) from (3):

$$\Delta F = k\Delta X \qquad (4)$$

or $$\frac{\Delta F}{\Delta X} = k \qquad (5)$$

From Equation 5 it is obvious that the amount of force $\Delta F$ required to produce a small change in displacement $\Delta X$ is constant and independent of the initial displacement $X_1$.

In orther words, considering the case of an extremely long helical spring made up of small diameter wire, the force $F_1$ required to compress the spring a small amount $X_1$ (or exerted by the spring when so compressed) would be relatively small. If the same spring were compressed by a large amount $X_2$, the force $F_2$ would be proportionately large but the force $\Delta F$ required to produce an additional small unit displacement $\Delta X$ with the spring in this condition would still be small because, for a perfect (linear) spring, the force $\Delta F$ required to produce unit displacement $\Delta X$ is the same regardless of the degree of compression of the spring.

This explains what is meant in characterizing the biasing means as exerting a high D.-C. force ($F_0$) with low A.-C. stiffness ($k$).

Returning to the theoretical analysis of the operation of the composite transducer under pre-compression, while this analysis indicates that in an ideal case cement may be eliminated entirely and replaced by the biasing force, practical considerations or limitations may sometimes make it impossible or undesirable to apply a mechanical bias of sufficient magnitude and having the requisite low A.-C. stiffness.

For example, the physical strength of the active elements might be inadequate to withstand the theoretical precompression without crushing, or the stiffness of the elements, as in the case of hollow tubes, might be so low that the low stiffness required in the bias means would render it incapable of exerting the theoretical amount of D.-C. force.

Another limiting factor on the amount of compressive force applied is the fact that some types of piezoelectric ceramics tend to depolarize when too highly stressed. The present invention, therefore, also contemplates the use of a combination of mechanical bias and cement. However, with such a combination the tensile strength of the cement bond is a secondary consideration thus allowing great freedom in selecting a cement which has a high mechanical Q and plasticity. The optimum combination of cement and bias would be determined empirically on the basis of the present disclosure taking into account such design considerations as the cements available, the properties of the particular piezoelectric elements employed (e.g., their stiffness, breaking strength, etc.), the operating conditions of the unit and the like.

Turning then to a description of practical embodiments of the present invention, one such embodiment is illustrated in Figures 2, 3 and 4 showing a driver unit indicated generally by reference character 20. The electromechanically active part of driver unit 20 consists of a stack 22 composed of a plurality of individual elements 24. Elements 24 may be of any piezoelectric or polarizable ferroelectric material, for example, quartz, ADP (ammonium dihydrogen phosphate) or KDP (potassium dihydrogen phosphate) or of barium titanate or lead titanate zirconate ceramics. Furthermore, the cross-sectional shape of the elements 24 is not important, that is, they may be discs, rings or hollow tubes, square or rectangular plates or of any other necessary or convenient shape. It is only necessary that the respective elements have opposite substantially parallel planar surfaces, such as 26 and 28, adapting them for stacking or surface contact with a contiguous body, and that the axis of electromechanical response be substantially perpendicular to such surfaces with a given location of the energizing electrodes. In the particular embodiment being described, the elements 24 are discs of fired barium titanate ceramic polarized in the axial or thickness direction. Each of the faces 26 and 28 of the several discs have applied thereto suitable electrodes (not shown). These electrodes preferably are either air-dried or fired-on films of silver. Each disc is provided with a tab or extension 30 which protrudes from between adjacent disc surfaces and is conductively associated with the electrodes of such surfaces. Each tab 30 is angularly displaced or rotated 180° from adjacent tabs to facilitate connection of discs 24, in electrical parallel, to a source of an A.-C. signal voltage as will hereinafter be described.

Each disc 24 contains a blind bore 32, centrally located in each of its faces, the respective bores being coaxially aligned and extending a fraction of the thickness of the disc. Thus with a plurality of discs arranged in stacked relation as shown in Figure 2, the respective bores of adjacent or confronting disc surfaces 26 and 28 register to receive an aligning pin 34. At each end of stack 22 is an electrically non-conducting member 36, which, in the illustrated embodiment, takes the form of a glass disc similar in diameter to discs 24. The respective inner faces 38 of members 36 bear on the outer surfaces of the end-most of discs 24 and contain blind bores 40 (one shown) similar to and registering with the respective comparable bores 32 of said discs and also containing aligning pins 34 (one shown). Bearing on the ends of stack 22 through electrically insulating members 36 are respective end members 42 and 44. End members 42 and 44 are preferably generally circular in cross-section and of substantially larger diameter than discs 24. Their inner surfaces are provided with circular flat-bottomed depressions 46 slightly larger in diameter than and adapted to partially receive and to seat insulator members 36.

Symmetrically circumferentially spaced about the axis of the stack 22 are a plurality of long, relatively thin rods 48 (one shown in Figure 2) which serve as the pre-compression or mechanical bias means and will be particularly described presently. In this embodiment, four rods 48 are used but it will be appreciated that any reasonable number not less than two may be used in a particular unit. The respective ends of rods 48 pass through suitably located, aligned bores 50 and 52 in the peripheral portions of end members 42 and 44, respectively. The outer ends of bores 50 and 52 are counterbored as at 54 to receive suitable packing 56 which seals around rods 48. The extreme ends of rods 48 are threaded to receive thereon adjustment nuts 60 which bear on the outer surfaces of the respective end members 42 and 44 through the medium of suitable flat washers 62 which may also serve to compress the packing in counterbores 54.

From the structure thus far described, it will be seen that rods 48 in conjunction with end members 42 and 44 and associated parts serve to maintain the discs 24 in stacked relation as shown in Figure 2. The desired amount of mechanical bias or precompression is obtained by the selective adjustment of nuts 60 so as to increase the tension in rods 48 tending to draw end members 42 and 44 together and exert a compressive force on stack 22.

As previously mentioned, the nature as well as the magnitude of the biasing force is important to closely approach the theoretical operation of stack 22.

Accordingly, the material and aggregate cross-sectional area of rods 48 must be selected, with due regard for the Young's modulus of the material and in relation to the Young's modulus and cross-sectional area of stack 22, so as to provide sufficient tensile strength to enable an adequate D.-C. biasing force to be exerted on the stack and at the same time be of sufficiently low A.-C. stiffness as not to materially impede longitudinal expansion of the stack.

In the illustrated embodiment satisfactory results have been obtained with 4 rods (48), each $5/16''$ in diameter, of steel, having a Young's modulus ($Y^E$) of $30 \times 10^6$ pounds/in.$^2$, the discs being about $2\frac{1}{8}''$ in diameter and $\frac{1}{2}''$ thick. Thus the ratio of cross-sectional areas is:

$$A_s/A_r = 3.55/.306$$

wherein $A_r$ is the aggregate cross-sectional area of rods 48 and $A_s$ is the cross-sectional area of the stack 22.

The ratio of Young's moduli is:

$$Y_s^E/Y_r^E = \frac{16 \times 10^6}{30 \times 10^6} = \frac{8}{15}$$

wherein subscripts $r$ and $s$ designate rods and stack, respectively.

Adopting $A \times Y^E$ as a parameter for comparing the A.-C. stiffness of the biasing means (rods 48) and stack 24, the ratio $$(A Y^E)_s/(A Y^E)_r = \frac{3.55 \times 8}{.306 \times 15} = 6.2$$

$$= R \text{ (``effective stiffness coefficient'')}$$

With this coefficient, the stiffness of rods 48 jointly constitute a "soft" spring capable of exerting a high D.-C. force with low A.-C. stiffness, in accordance with the previously explained concept. The exact material and dimensions of the rods 48 for any given unit, can be empirically determined to achieve the stated requisites; the resulting value of the effective stiffness coefficient R may vary from the example given but the range of operative values is about 1 to 25.

If the cofficient R is lower than 1, the stiffness of the unit as a whole is too high resulting in a low electro-mechanical coupling and undesirably narrow band width of frequency response. On the other hand the upper limit on value of R is imposed by the strength of the material from which rods 48 are formed and the amount of bias force required. Obviously, for a given value of bias force, the total cross-section of the rods must be sufficient to prevent rupture or stretching of the rods beyond their elastic limit when such force is applied.

It has been found that an extremely thin film, for example a mono-molecular film, of oil or a like viscous fluid between the contacting surfaces 26, 28 of the several discs enhances the mechanical coupling therebetween. This is particularly true where the disc surfaces are not perfectly smooth and it is impossible or inexpedient to provide perfectly smooth surfaces.

In lieu of a film of oil, a cement having a high mechanical Q and good plasticity may also be used between disc faces, and the amount of mechanical bias reduced in proportion to the adhesive ability of such cement. It is thus seen that neither the maximum theoretical bias nor the maximum bias permissible in practice need be applied in all cases. Above a minimum quantity of bias (approximately 1000 pounds per square inch of cross-sectional area of the stack) the improvement in operation of the stack appears to be directly proportional to the mechanical bias up to the maximum indicated by theory.

It should be noted that the rods 48, or whatever other means are devised to apply the bias, should exert a small amount of compression even when the stack is fully contracted in response to the signal applied in operation. In other words, the tensile stress in the rods should never be zero under operating conditions. This requirement can be fulfilled by using rod dimensions and material such that under the initial tension applied with the stack in mean (unenergized) condition, the rods will be stretched by an amount greater than the maximum amplitude of the stack. Alternatively, the rods can be tensioned a smaller amount by adjustment of nuts 60 and a constant D.-C. electrical bias applied to the stack of such polarity as to cause expansion of the stack and elongation of the rods. The D.-C. electrical bias is maintained in operation and has the effect of moving base line E (Figure 1) toward the original base line C.

Referring again to Figure 2, the electroded disc faces are electrically connected in parallel across a source (not shown) of an A.-C. signal voltage. This is accomplished by means of a pair of bus wires 64 and 66, both of which appear in cross section in Figure 4. Inasmuch as the bus wires are identical in structure and installation, only the one appearing in Figure 2 will be described. The left hand end of bus wire 64 carries a flanged cylindrical mounting member 68 slidably received in a suitably dimensioned and located bore 70 in end member 42. The right hand end of bus wire 64 is rigidly fixed in a terminal coupling member 72 threaded into a suitably located tapped hole 74 in the inner face of end member 44. Mounted in this manner, with one end fixed relative to end member 44 and the opposite end slidably mounted in end member 42, the pulsations of the end members do not cause flexing of the bus wires 64, 66. The electrode tabs 30 of successive discs are connected alternately to one and the other of the bus wires by means of slack, highly flexible branch leads 76 (Figures 2 and 4).

The entire stack 22 and its associated bus and lead wires as well as biasing rods 48 are enclosed in a cylindrical housing member 78. The circumferential surfaces of end members 42 and 44 contain a pair of spaced grooves 80 and 82 containing O-rings 84 and 86, respectively. The inner diameter of housing 78 at its ends is such with respect to the outer diameter of end members 42 and 44 that the inner portions of the end members, up to the locus of grooves 82, are freely received in the ends of the sleeve with substantial clearance and O-rings 86 are of sufficient diameter relative to the depth of the groove 82 as to sealingly engage both the bottom of the groove and the inner surface of the sleeve. Grooves 80 are located outwardly with respect to grooves 82 and are of greater root diameter, i.e., shallower, so that O-rings 84 bear on the inner edges of the ends of sleeve 78. Snap rings 88 removably disposed in grooves 80 retain O-rings 84 between themselves and the ends of sleeve 78. From the structure thus far described it will be seen that the active members of the assembly, including primarily stack 22 and end members 42 and 44 are electrically and acoustically isolated from sleeve 78 and sealed therein so that all components disposed within the sleeve are protected from damage due to mechanical shock and from water when the particular installation requires submersion of the unit.

As shown in Figure 2, end member 44 contains a bore 90 coaxially connecting with tapped bore 74 which contains the terminal fitting 72 of bus wire 64. Bore 90 is provided with a coupling fitting 92 threaded or otherwise secured in the outer end of the bore. A lead wire 94 is connected to terminal fitting 72 and passed through bore 90 and fitting 92 to a source of A.-C. signal voltage of the desired frequency and intensity. Lead wire 94 may be encased in a water-tight shielding (not shown) connected to fitting 92, where the unit 20 is for a subaquatic installation. While it does not appear in the Figure 2, end member 44 is provided with a second bore identical to and located diametrically opposite bore 90 and is provided with associated structure 72, 74 and 92, 94 as just described for bore 90 for connecting bus wire 66 (Figure 4) to the A.-C. signal source.

The operation of drive unit 20 is believed to be self-evident from the foregoing description and theoretical analysis. Stated briefly, the A.-C. signal applied to leads 94 (one shown) is conducted to bus wires 64, 66 and thence through branch leads 76 to the electrodes on the faces of discs 24. During one half-cycle, the discs expand simultaneously from their pre-compressed condition stretching rods 48 and driving end members 42 and 44 in opposite directions, provided of course that both end members are free to move. In customary installations, end member 44 would be mechanically connected to a sufficiently large mass as to be held substantially stationary, in which case end member 42 would be coupled to a radiating member acoustically exposed to the transmission medium. During the next half-cycle the individual discs simultaneously contract allowing the tension in rods 48, in the manner of a return spring, to draw end members 42 and 44 toward their starting points and thus preserve the integrity of the stack 22.

Figure 5:
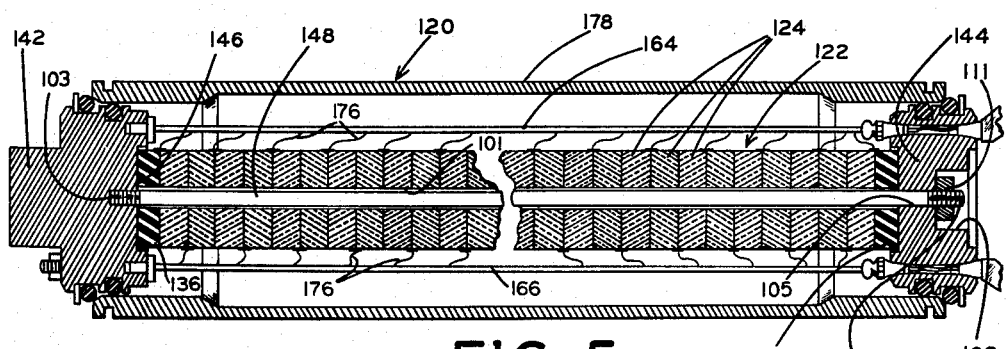
Figure 5 is an axial sectional view of a modification of the invention.

A modified form of the present invention is illustrated in Figure 5 in which parts in common with or wholly analogous to those of the Fig. 1 embodiment are designated by the same reference numerals increased by a factor of 100. It should be noted that Figure 5 is a section in a single diametral plane and not in 2 radial planes such as indicated by section line 2—2 on Figure 3. In this modification the stack 122 is composed of a plurality of annular discs 124 of a piezoelectric material having respective central apertures 101 in coaxial alignment. Electrically non-conducting members 136 at each end of stack 122 are likewise in the form of annular discs coaxially disposed with respect to the piezoelectric elements 124. Stack 122 and insulating members 136 are disposed between end members 142 and 144. A rod 148 comparable to the plurality of rods 48 in the first described embodiment has one end threaded or otherwise rigidly secured as at 103 to the inner face of end member 142, extends through the aligned central apertures of the piezoelectric and insulating members 122 and 136, respectively, and has its opposite end extending through a suitably located and dimensioned bore 105 in end member 144. The extreme right hand end of rod 148 terminates in a threaded portion 107 disposed in a large diameter recess 109 in the outer face of end member 144. A nut 111 receivable with ample tool clearance in recess 109 engages the threaded portion 107 of rod 148 and is drawn up to exert the desired amount of tension on the rod. Except for the use of the single, centrally-located rod 148 in place of a plurality of external rods 48, the remainder of the structure and the function of the Fig. 5 modification are in all respects the same as that of the first described embodiment.

Figure 6:
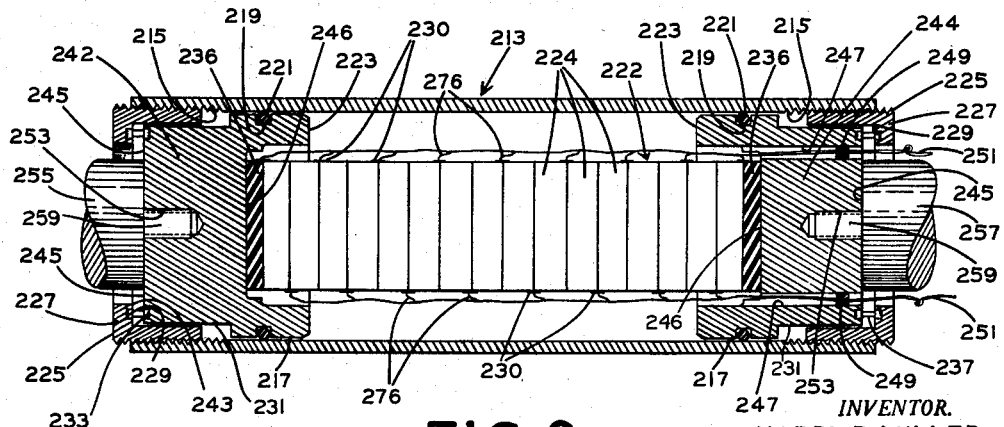
Figure 6 is an axial sectional view similar to Figure 5 of another modification of the invention.

Still another modification of the invention is illustrated in Figure 6 in which parts in common with or wholly analogous to those already described in conjunction with the first embodiment are identified by the same reference numerals increased by a factor of 200. In this embodiment a stack 222, comprised of discoid piezoelectric elements 224 and electrically insulating members 236, is disposed in a cylindrical housing member 213, having end portions internally threaded as at 215.

Slidably received within respective ends of housing 213 are two end members 242 and 244, of circular cross-section and comprising enlarged portions 217 of slightly smaller diameter than the interior of housing 213. Each enlarged portion 217 is provided with an annular groove 219 containing an O-ring 221 which sealingly engages the inner walls of housing member 213.

The respective inner faces 223 of end members 242, 244 contain concentric recesses 246 larger in diameter than and freely receiving and seating the end-most elements 224 and insulating members 236 of stack 222. Adjustably threaded into each end of housing 213 is an annular retainer member 225 having an inwardly extending radial flange 227. As best appears in the detail view, Figure 7, each radial flange 227 contains a concentric annular groove 229 in its inner face 243. End members 242 and 244 are formed with reduced diameter outer end portions 231 which are received with substantial operating clearance in the respective retainer members 225. As best seen in Figure 7, the radial, outer end surfaces 245 of each of the end members 242, 244 conform generally in location and configuration to and oppose the inner radial surface 243 of respective flanges 227. Each surface 245 contains a groove 233 similar to and located opposite the groove 229 in the respective flange 227. In the bottom of grooves 229 and 233 are annular cushions 235 of rubber or similar material. As best appears in Figure 7, an annular, I-section compression member 237 is disposed between each of the opposing surfaces of closure members 242, 244 and the respective flanges 227. The annular web portion 239 of the I-section 237 is disposed substantially perpendicular to the radial planes of grooved faces 243 and 245. The flanges 241 of the I-section are dimensioned so as to be slidably received in respective grooves 229 and 233 and to bear on the annular cushions 235 through flat washers 261. From the structure thus far described it will be seen that by threading retainer members 225 inwardly a compressive pressure is brought to bear on stack 222 through the medium of end members 242, 244 and compression members 237. The annular cushions 235 provide the requisite "softness" or low A.-C. stiffness.

End member 244 contains a pair of longitudinal bores 247 which extend from spaced points at the bottom of recess 213, radially outwardly of the area against which stack 222 bears, to the outer face of the respective end members. Bores 247 serve to accommodate passage of wire leads into the housing 213 for connecting the stack 222 to a suitable source, not shown, of an A.-C. signal voltage. Thus, in the illustrated embodiment, bores 247 contain apertured sealing plugs 249 through which pass flexible conducting leads 251. The outer ends of leads 251 are adapted for connection to the voltage source as already mentioned whereas the segments of the leads within housing 213 carry the necessary number of highly flexible branch leads 276 each conductively secured to a respective electrode tab 230 so that the individual elements 224 of stack 222 are connected across the voltage source in electrical parallel in the same manner as in the previously described embodiments.

The outer faces of closure members 242, 244 are provided with tapped holes 253 for the mechanical connection thereto of resonator or radiator members such as represented by rods 255, 257. Rods 255 and 257 are provided with coaxial studs 259 which are threaded into respective tapped holes 253. One of the rods 255, 257 may also represent part of a mounting structure of substantial mass as where one end of the unit is to be held stationary.

As in the previously described embodiments, the modification illustrated in Figure 6 has its active component (stack 222) and associated wiring electrically and acoustically insulated from and sealed within housing 213. The operation of this modification is, in principle, the same as already described.

Referring now to Figures 8, 9 and 10, there is illustrated an embodiment of the invention in which the mechanical bias is applied to a composite transducer unit 300 employing what is effectively a single active element although, as will be seen, it comprises a plurality of piezoelectric members stacked in a direction perpendicular to the axis of the bias. Thus unit 300 comprises as principal components, a radiator 302, a driver section 304, and a resonator 306.

Radiator member 302 is a block of non-piezoelectric material adapted for acoustic exposure to the transmission medium. The particular material and dimensions of radiator member 302 are important to satisfactory operation of the unit but are not part of the present disclosure nor necessary to an understanding of the instant invention. The same is true of resonator member 306 which is also a block of piezoelectrically inactive material. Sandwiched between radiator 302 and resonator 306 as hereinafter explained in detail, driver section 304 is composed of one or more groups (6 are shown) 308, 308a, 310, 310a, 312 and 312a of piezoelectric elements 314. In this particular unit elements 314 are rectangular plates of ammonium dihydrogen phosphate (ADP) of a type konwn as 45° Z-cut expanders. With a signal applied to the major planar faces, plates 314 expand and contract in the direction indicated by the double-headed arrows 316 in Figure 8.

In the illustrated embodiment, each of the groups 308, 308a, 310, 310a, 312 and 312a is made up of two plates 314 having their major planar surfaces electroded and cemented together. Suitable means, not shown, are provided for conductively connecting the several plates of each group in electrical parallel across a source of signal voltage, likewise not shown.

As apparent from Figures 8, 9 and 10, the groups of plates 314 are interposed between radiator 302 and resonator 306 with their major planar surfaces and axis of electromechanical response substantially perpendicular thereto. If necessary or desired a suitable cement or viscous fluid may be applied in a thin film between the abutting edge surfaces of plates 314 and the radiator and resonator members 302 and 304, respectively. Groups 308, 310 and 312 are spaced from respective groups 308a, 310a, and 312a and the intervening gap filled, as at 317, with phenolic resin or similar material.

According to the invention, mechanical bias is applied in the direction of electromechanical action by means of a pair of parallel rods 318 and 320 which conform to the principles and requirements hereinbefore explained. The upper ends of rods 318 and 320 are threaded or otherwise suitably secured to the underside of radiator member 302 and extend perpendicularly downward through suitable bores 322 in the phenolic spacer material 317, and through bores 324, in resonator member 306.

The lower ends of bores 324 are counterbored or enlarged as at 328 and the lower ends of rods 318 and 320 extending into the counterbores are threaded as at 330 to receive adjustment nuts 332. Rods 318 and 320 are tensioned to exert the desired bias force by tightening nuts 332 which bear on the shoulder created by the junction of bores 324 and counterbores 328. Suitable washers 334 are provided under nuts 332.

The structural considerations and operation attaching to the previously described embodiments apply to unit 300 also. The maximum bias would be more limited, quantitatively, by the greater frangibility of ADP as compared to ceramic elements. However, the liability of depolarizing ceramic elements would not be a consideration where piezoelectric crystals are employed.

In will be appreciated that a single biasing rod could be used, particularly in a unit employing only a single group of crystals. Likewise more rods could be used in the illustrated unit or larger units.

Figure 11:
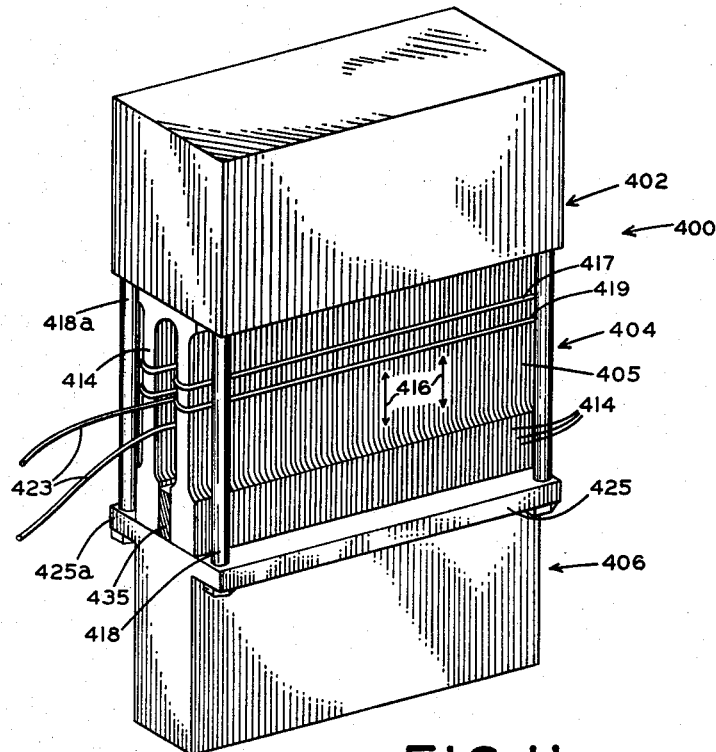
Figure 11 is a perspective elevational view of a magnetostrictive type transducer unit embodying the present invention.
Figure 12:
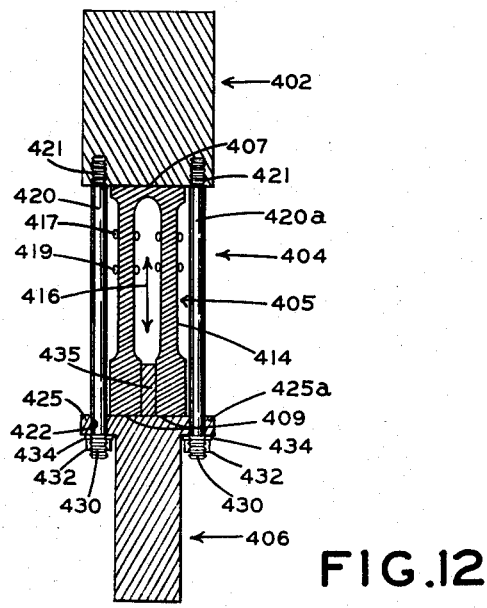
Figure 12 is a sectional view of the structure shown in Figure 11.

Illustrated in Figures 11 and 12, is a magnetostrictive type electromechanical transducer unit 400 embodying the invention. Inasmuch as this unit is generally similar in structure to that illustrated in Figures 8, 9, and 10, corresponding reference numerals increased by a factor of 100 will be used to identify parts in common with or wholly analogous to those already described in conjunction with unit 300. Thus, unit 400 comprises as principal components a radiator member 402, a driver section 404, and a resonator member 406.

As in unit 300, radiator member 402 is a block of non-active material adapted for acoustic exposure to the transmission medium. Resonator member 406 likewise is of non-active material. Sandwiched between members 402 and 406 are a plurality of identical, relatively thin, generally U-shaped magnetostrictively active elements 414. Elements 414 are, in themselves, conventional, and, in a manner well known in the art, are stacked to form a core 405 having its plane of symmetry coincident with the direction of magnetostrictive response which is indicated by double-headed arrows 416. As is clearly apparent in Figures 11 and 12 the bight or loop end of each U-shaped element 414 has a flat or planar external surface 407. Similarly the ends of the legs of U-shaped elements 414 have flat surfaces 409. With elements 414 arranged in stacked relation the flat end surfaces 407 and 409 co-act to provide planar surfaces on the core 405 which abut corresponding planar surfaces of radiator 402 and resonator 406. If necessary or desired, a suitable cement or viscous fluid may be applied in a thin film between the abutting surfaces of elements 414 and members 402 and 406.

The respective legs of magnetostrictive core 405 are wrapped with coils of wire, represented in the drawings by single wires 417 and 419. As is well known, the coils wrapping the legs of core 405, when connected to a suitable source of electrical energy, provide a magnetizing field which induces magnetostrictive response in the core causing linear expansion or contraction in the direction of arrows 416. Inasmuch as the magnetostrictive effect, unlike the piezoelectric effect, does not involve a change in sign of mechanical distortion in response to polarity changes in the energizing potential, a polarizing magnet 435 is placed between the legs of core 405 adjacent the free ends thereof. This is a customary expedient and causes the magnetostrictive response of the elements to follow the polarity reversals of the applied signal. Coils 417 and 419 are connected in series and lead wires 423 are provided for connecting the coils across a suitable voltage source, not shown.

According to the invention, mechanical bias is applied in the direction 416 of magnetostrictive response by means of four parallel rods 418, 418a, 420, and 420a. The rods are disposed generally in the corners of the unit and have their upper ends 421 threaded or otherwise suitably secured to the underside of radiator member 402. The lower ends of rods 418, 418a, 420, and 420a pass through suitable apertures 422 in flanges 425 and 425a which extend laterally outward from and along the sides of resonator member 406 adjacent the upper surface thereof.

The extreme lower ends of rods 418, 418a, 420 and 420a are threaded as at 430 to receive nuts 432 which bear on the undersides of flanges 425 through the medium of flat washers 434 placed under the nuts. Selective tightening of nuts 432 enables the desired amounts of mechanical bias to be exerted on the core 405 of driver section 404 in accordance with the principles already set forth. The dimensional and elasticity relationship between the rods 418, 418a, 420, 420a on one hand and core 405 on the other, defined by the effective stiffness parameter "R" as previously explained applies to this embodiment also. The operation of the unit 400 is basically the same as that of the previously described embodiments except that the mechanical displacements are caused by magnetostrictive rather than piezoelectric action.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A composite electromechanical transducer unit including at least two elements at least one of which is electromechanically active, said elements each having at least one planar surface, the planar surface of said one active element being substantially perpendicular to the axis of electromechanical response of said element, said elements being arranged with said planar surfaces superposed; electrical conductor means operatively associated with said active element for applying electrical energy thereto so as to cause mechanical distortion thereof along said axis; and means of low A.-C. stiffness for exerting a high D.-C. mechanical compressive force on said active element, said force being so directed, substantially perpendicular to the plane of said surfaces, as to bias said surfaces toward each other and to compressively distort said active element by a predetermined quantity from the mean condition assumed thereby in the absence of any electrical energy applied to said active element.

2. An electromechanical transducer unit according to claim 1 including, between said planar surfaces, a thin film of material characterized by relatively high mechanical Q and high plasticity.

3. An electromechanical transducer unit according to claim 1 including means for applying to said active element a D.-C. electrical potential of such polarity and magnitude as to counteract, at least partially, said mechanical compressive force.

4. An electromechanical transducer unit according to claim 1 wherein said means includes at least one member, of a material of relatively high mechanical strength, constructed and arranged to exert said compressive force and having a minimum cross-sectional area which is such, in relation to the Young's modulus of said material and to the cross-sectional area and Young's modulus of said active element, as to exert said compressive force with an effective A.-C. stiffness low in comparison with that of the active element.

5. An electromechanical transducer unit according to claim 1 wherein said means comprises at least one rod, of relatively high tensile strength material, acting in tension to exert said force, the ratio of the product of the respective cross-sectional area and Young's modulus of said element to that of said rod having a numerical value of at least unity.

6. An electromechanical transducer unit comprising a stack of electromechanically active elements each individually adapted to expand and contract along the axis of said stack in response to the application thereto of an electrical signal of fluctuating intensity; electrode means operatively associated with said elements; conductor means operatively connecting said elements in parallel, through said electrodes, to a source of such a signal; and means of low A.-C. stiffness for exerting on said stack an axially directed, resilient mechanical compressive force of sufficient magnitude to compressively distort said elements by a predetermined quantity from the mean condition assumed thereby in the absence of any electrical energy applied to said elements.

7. An electromechanical transducer unit according to claim 6 including, between the several elements of said stack, a thin film of an adhesive material characterized by high mechanical Q and high plasticity.

8. An electromechanical transducer unit comprising a plurality of electromechanically active elements of planar configuration arranged with respective major planar surfaces superposed so as to form a stack, said elements being individually adapted to expand and contract along an axis substantially perpendicular to said planar surfaces in response to the application thereto of an electrical signal of fluctuating intensity; electrode and conductor means operatively associated with said elements to apply such a signal field thereto; and means of low A.-C. stiffness relative to the stiffness of said stack resiliently mechanically biasing the ends of said stack together with a force acting generally in the direction of said axis and of sufficient magnitude to compress and displace said elements by a predetermined quantity from the respective mean positions occupied thereby in the absence of said signal field.

9. An electromechanical transducer unit comprising a plurality of electromechanically active elements of discoid configuration coaxially arranged with major planar surfaces superposed so as to form an elongate stack, said elements being individually adapted to expand and contract along an axis perpendicular to said planar surfaces in response to the application thereto of an electrical signal of fluctuating intensity; electrode means operatively associated with the planar surfaces of said elements; conductor means operatively connecting said elements in electrical parallel, through said electrodes, to a source of such a signal; a discoid electrical insulating member at each end of said stack; an end member, of substantially larger cross-sectional dimensions than said elements, disposed at each end of said stack and having flat surfaces adapted to bear on the ends of said stack through said insulating members; a plurality of thin rods of high tensile-strength material symmetrically disposed about and substantially parallel to the longitudinal axis of said stack and having respective ends mechanically connected to said end members, the ratio of the product of the Young's modulus of the material and the aggregate cross-sectional area of said stack to the product of the Young's modulus of the material and the cross-sectional area of said rods having a numerical value in the range from 1 to 25 and means for adjustably tensioning said rods so as to exert a compressive force on said stack in the order of at least 1000 pounds per square inch of cross section of said elements.

10. An electromechanical transducer unit comprising a plurality of electromechanically active elements of discoid configuration coaxially arranged with major planar surfaces superposed so as to form an elongate stack, said elements being individually adapted to expand and contract along an axis perpendicular to said planar surfaces in response to the application thereto of an electrical signal of fluctuating intensity; electrode means operatively associated with the planar surfaces of said elements; conductor means operatively connecting said elements in electrical parallel, through said electrodes, to a source of such a signal; a discoid electrical insulating member at each end of said stack; an end member, of substantially larger cross-sectional dimensions than said elements, disposed at each end of said stack and having flat surfaces adapted to bear on the ends of said stack through said insulating members; a plurality of thin rods of high tensile-strength material symmetrically disposed about and substantially parallel to the longitudinal axis of said stack and having respective ends mechanically connected to said end members, the ratio of the products of the respective Young's modulus and cross-sectional area of said stack and said rods having a numerical value in the range from 1 to 25; and means for adjustably tensioning said rods so as to elongate said rods by an amount at least equal to the amplitude of expansion and contraction of said stack in response to said signal.

11. An electromechanical transducer unit according to claim 10 wherein said tensioning means includes a D.-C. electrical bias continuously applied to said stack in operation and having a polarity selected to cause expansion of the active elements of said stack.

12. An electromechanical transducer unit comprising a plurality of electromechanically active elements each having a pair of substantially parallel major planar surfaces and containing a through central aperture generally perpendicular to said surfaces, said elements being individually adapted to expand and contract along an axis perpendicular to said planar surfaces in response to the application thereto of an electrical signal of fluctuating intensity, said elements being superposed with said apertures aligned so as to form a stack; electrode means operatively associated with the planar surfaces of said elements; conductor means operatively connecting said elements in electrical parallel, through said electrodes, to a source of such a signal; an insulating member at each end of said stack; end members, disposed at each end of said stack and having surfaces generally conforming in dimension to said planar surfaces and adapted to bear on the ends of said stack through said insulating members; a relatively thin rod of high tensile-strength material disposed within the aligned apertures of said elements and having its ends mechanically connected to respective ones of said end members, the ratio of the product of the Young's modulus and cross-sectional area, respectively, of said stack to that of said rods having a numerical value of at least unity; and means for adjustably tensioning said rod so as to exert a compressive force on said stack in excess of 1000 pounds per square inch of cross-section of said surfaces.

13. An electromechanical transducer unit comprising a plurality of electromechanically active elements each having a pair of substantially parallel major planar surfaces and being arranged with said planar surfaces superposed so as to form a composite stack, said elements being individually adapted to expand and contract along an axis substantially perpendicular to said planar surfaces in response to the application thereto of an electrical signal of fluctuating intensity; a member of electrical insulating material disposed at each end of said stack; and mechanical means of low A.-C. stiffness relative to said stack for exerting a compressive force on said stack through said insulating bodies, said force being sufficient in magnitude, in relation to the dimensions and compliance of said deformable bodies, to compressively distort and displace said elements by a predetermined quantity from a mean position occupied thereby in the absence of such electrical signal.

14. An electromechanical transducer unit according to claim 13 wherein said mechanical means comprises a housing member laterally enveloping said stack; end members, slidable in said housing, bearing on the ends of said stack through said insulating members; retainer means at the ends of said housing and adjustably associated therewith to permit relative adjustment of the linear distance between said retainer means to exert a compressive force on the ends of said stack through said end members; and at least one body of a deformable material interposed and confined between the respective end and retainer members.

15. An electromechanical transducer unit comprising a plurality of electromechanically active elements each having a pair of substantially parallel major planar surfaces and being arranged with said major planar surfaces superposed so as to form a composite stack, said elements being individually adapted to expand and contract along an axis substantially perpendicular to said planar surfaces in response to the application thereto of an electrical signal field of fluctuating intensity; electrode and conductor means operatively associated with said active elements for applying such a signal field thereto; an electrically non-conducting member at each end of said stack; an end member at each end of said stack adapted to bear on the respective non-conducting members; and means of low A.-C. stiffness, for adjustably varying the linear distance between said end members, so constructed and arranged that a large D.-C. compressive force may be brought to bear on said stack.

16. An electromechanical transducer unit according to claim 15 wherein said last named means comprises at least one rod of resilient, high tensile strength material extending longitudinally relative to said stack and having its ends mechanically connected to said end members, the material and dimensions of said rod being such that the stiffness of the rod is less than that of the stack.

17. An electromechanical transducer unit comprising a stack of discoid polarizable ferroelectric ceramic elements polarized in the thickness direction and having electroded major planar surfaces; means for applying an electrical signal of fluctuating intensity to said electrodes so as to cause alternate expansion and contraction of said elements in phase; means for applying to said electrodes a D.-C. electrical voltage of a polarity causing expansion of said elements; and adjustable means for applying to the ends of said stack a compressive force of sufficient magnitude to compressively distort and displace said elements from the mean position occupied thereby in the absence of any electrical signal applied to said electrodes, the stiffness of said adjustable means being less than that of said stack.

18. A composite electromechanical transducer unit comprising a radiator member; a resonator member; and, interposed between said members, a driver section made up of a body of electromechanically responsive material, said body having surfaces in abutment with said members and having its axis of electromechanical response substantially perpendicular thereto; means for applying electrical energy to said body adapted to cause alternate expansion and contraction thereof along said axis; and mechanical means of low A.-C. stiffness adapted to bias said members toward each other, exerting a large compressive force on said body, the stiffness of said mechanical means being no greater than that of said body.

19. A composite electromechanical transducer according to claim 18, said body consisting of a plurality of plates of a piezoelectric crystalline material, arranged in stacked relation with their major planar surfaces substantially perpendicular to said resonator and radiator member.

20. A composite electromechanical transducer unit according to claim 18, said driver section comprising a magnetostrictive core made up of a number of plate-like magnetostrictive elements arranged in stacked relation with their major planar surfaces substantially perpendicular to said resonator and radiator members.

References Cited in the file of this patent

UNITED STATES PATENTS

| | | |
|---|---|---|
| 2,411,911 | Turner | Dec. 3, 1946 |
| 2,435,031 | Burns et al. | Jan. 27, 1948 |
| 2,534,276 | Lancor | Dec. 19, 1950 |